(12) United States Patent
Toya et al.

(10) Patent No.: US 11,450,914 B2
(45) Date of Patent: Sep. 20, 2022

(54) STORAGE BATTERY UNIT

(71) Applicant: Panasonic Intellectual Property Management Co., Ltd., Osaka (JP)

(72) Inventors: Shoichi Toya, Hyogo (JP); Takeshi Nakashima, Hyogo (JP); Yohei Yamada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 326 days.

(21) Appl. No.: 16/616,952

(22) PCT Filed: May 29, 2018

(86) PCT No.: PCT/JP2018/020429
§ 371 (c)(1),
(2) Date: Nov. 25, 2019

(87) PCT Pub. No.: WO2018/221474
PCT Pub. Date: Dec. 6, 2018

(65) Prior Publication Data
US 2020/0251700 A1    Aug. 6, 2020

(30) Foreign Application Priority Data
Jun. 1, 2017 (JP) ............................. JP2017-109443

(51) Int. Cl.
*H01M 10/48*    (2006.01)
*H01M 10/46*    (2006.01)
(Continued)

(52) U.S. Cl.
CPC ....... *H01M 50/20* (2021.01); *H01M 10/0525* (2013.01); *H01M 10/425* (2013.01);
(Continued)

(58) Field of Classification Search
CPC combination set(s) only.
See application file for complete search history.

(56) References Cited

U.S. PATENT DOCUMENTS

2013/0065087 A1    3/2013    Kim et al.
2013/0071713 A1*   3/2013    Kim ................... H01M 50/271
                                                              429/99
(Continued)

FOREIGN PATENT DOCUMENTS

CN    102263211 A    * 11/2011    ........ H01M 10/0413
CN    102656717 A    *  9/2012    .......... H01M 2/1016
(Continued)

OTHER PUBLICATIONS

Extended European Search Report issued in corresponding European Patent Application No. 18808752.2, dated Jul. 27, 2020.
(Continued)

*Primary Examiner* — Kaity V Chandler
(74) *Attorney, Agent, or Firm* — McDermott Will & Emery LLP

(57) ABSTRACT

A storage battery unit includes: a battery module having a plurality of cells, and a module circuit connected to (i) an electric power line and (ii) a communication line; a unit circuit connected to (i) the module circuit by the electric power line and the communication line, and (ii) an electric power conversion device disposed externally; and a casing that accommodates the battery module and the unit circuit. The casing includes a top plate, a bottom plate, and a front plate respectively disposed on a top surface, bottom surface, and front surface of the storage battery unit. The top plate includes a first top plate portion that substantially covers an entirety of the top surface. The front plate includes a first lateral plate portion that substantially covers an entirety of
(Continued)

the front surface, and a fixing component. The fixing component is disposed along the first top plate portion.

4 Claims, 9 Drawing Sheets

(51) Int. Cl.
  *H01M 10/0525* (2010.01)
  *H01M 10/42* (2006.01)
  *H05K 5/02* (2006.01)
  *H04M 1/02* (2006.01)
  *H01M 50/20* (2021.01)
  *H01M 50/543* (2021.01)
(52) U.S. Cl.
  CPC ........... *H01M 10/46* (2013.01); *H01M 10/48* (2013.01); *H01M 50/543* (2021.01); *H04M 1/0262* (2013.01); *H05K 5/02* (2013.01)

(56) References Cited

U.S. PATENT DOCUMENTS

| | | | | |
|---|---|---|---|---|
| 2013/0288087 | A1 | 10/2013 | Nomura et al. | |
| 2016/0013467 | A1* | 1/2016 | Kawata | H01M 50/20 429/159 |
| 2016/0099489 | A1* | 4/2016 | Park | H01M 50/20 429/120 |
| 2016/0141566 | A1* | 5/2016 | Hamada | H01M 10/0481 429/151 |
| 2016/0149177 | A1* | 5/2016 | Sugeno | H01G 11/10 429/151 |
| 2016/0149180 | A1* | 5/2016 | To | H01M 10/647 429/154 |
| 2016/0308186 | A1* | 10/2016 | Han | H01M 50/293 |
| 2017/0062783 | A1* | 3/2017 | Kim | H01M 10/052 |
| 2018/0048033 | A1 | 2/2018 | Lee et al. | |

FOREIGN PATENT DOCUMENTS

| | | | | |
|---|---|---|---|---|
| CN | 104425781 A | * | 3/2015 | .......... H01M 2/1061 |
| CN | 106207045 A | * | 12/2016 | ............ H01M 10/48 |
| CN | 105098111 B | * | 9/2017 | .......... H01M 10/613 |
| EP | 0576138 A1 | | 12/1993 | |
| JP | H5-160585 A | | 6/1993 | |
| JP | 3128531 U | | 1/2007 | |
| JP | 2013-58478 A | | 3/2013 | |
| JP | 2013-239454 A | | 11/2013 | |
| JP | 2016115458 A | * | 6/2016 | ............. Y02E 60/10 |
| JP | 2017-005000 A | | 1/2017 | |
| JP | 2017-005027 A | | 1/2017 | |
| WO | WO-2012173233 A1 | * | 12/2012 | ............. H01G 11/10 |
| WO | 2016/204470 A1 | | 12/2016 | |

OTHER PUBLICATIONS

International Search Report issued in corresponding International Patent Application No. PCT/JP2018/020429, dated Aug. 14, 2018, with English translation.

* cited by examiner

STORAGE BATTERY UNIT

CROSS-REFERENCE OF RELATED APPLICATIONS

This application is the U.S. National Phase under 35 U.S.C. § 371 of International Patent Application No. PCT/JP2018/020429, filed on May 29, 2018, which in turn claims the benefit of Japanese Patent Application No. 2017-109443, filed on Jun. 1, 2017, the entire disclosures of which Applications are incorporated by reference herein.

TECHNICAL FIELD

The present invention relates to a storage battery unit that includes a battery module having cells.

BACKGROUND ART

Patent Literature (PTL) 1 discloses a storage battery unit that includes a storage battery module having a battery pack including cells.

CITATION LIST

Patent Literature

PTL 1: Japanese Unexamined Patent Application Publication No. 2013-58478

SUMMARY OF THE INVENTION

Technical Problem

It was not possible to easily perform maintenance work and the like on the storage battery unit with the technique of PTL 1.

Accordingly, the present invention provides a storage battery unit that can easily be worked on.

Solution to Problem

A storage battery unit according to an aspect of the present invention includes: a battery module that includes a plurality of cells, and a module circuit connected to (i) an electric power line for inputting and outputting electric power to and from the plurality of cells and (ii) a communication line for inputting and outputting information about the plurality of cells; a unit circuit that is connected to (i) the module circuit by the electric power line and the communication line, and (ii) an electric power conversion device disposed externally; and a casing that accommodates the battery module and the unit circuit. The casing includes a plurality of tabular components. The plurality of tabular components include at least a top plate disposed on a top surface of the storage battery unit, a bottom plate disposed on a bottom surface, and at least one lateral plate disposed on a lateral surface excluding the top surface and the bottom surface of the storage battery unit. The top plate includes a first top plate portion that substantially covers an entirety of the top surface. The at least one lateral plate includes a first lateral plate portion that substantially covers an entirety of the lateral surface, and a fixing component that is tabular and connected to the first lateral plate portion. The fixing component is disposed along the first top plate portion.

Advantageous Effect of Invention

The storage battery unit of the present invention makes it possible to easily work on the storage battery unit.

DESCRIPTION OF EXEMPLARY EMBODIMENT

Figure 1:
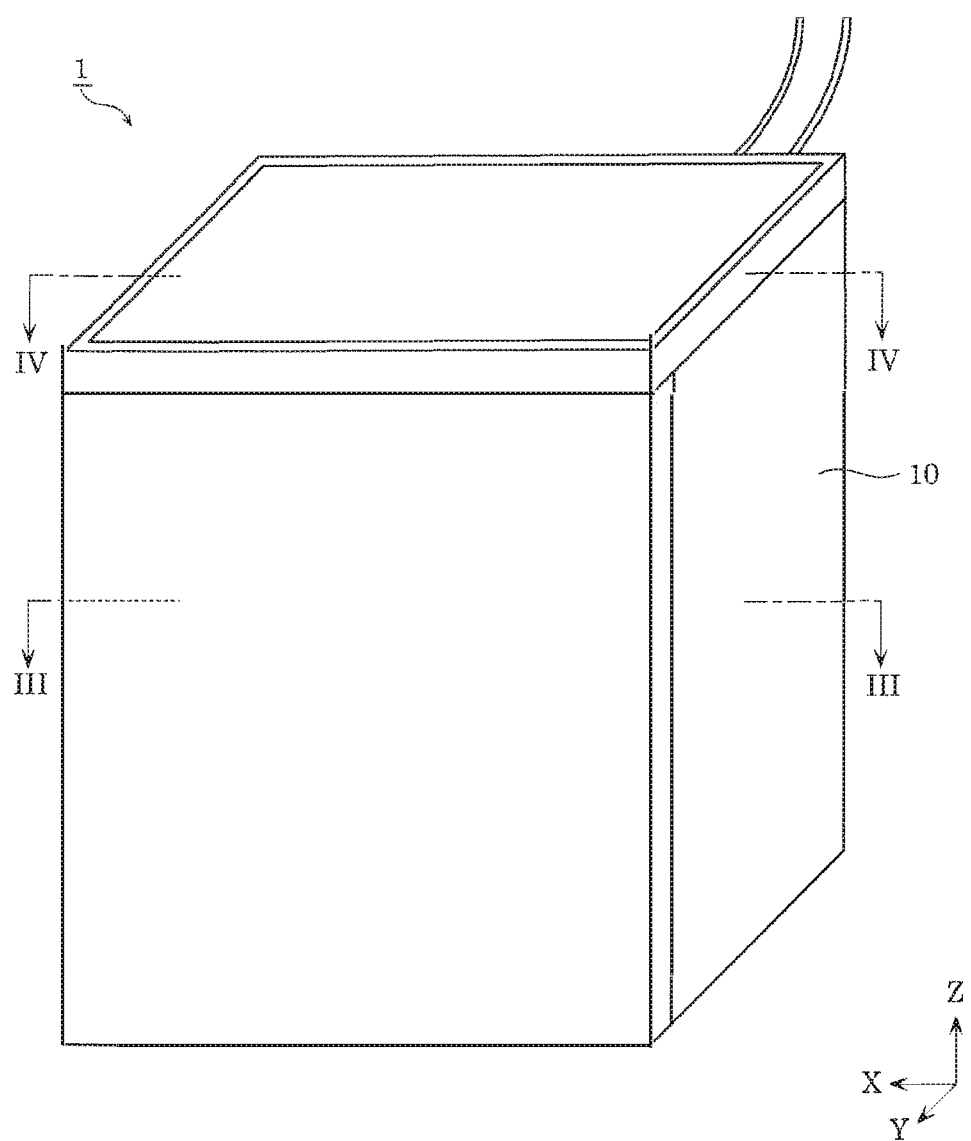
FIG. 1 is a perspective view of an example of an exterior of a storage battery unit according to an embodiment.

Hereinafter, a storage battery unit according to an embodiment will be described with reference to the drawings. Note that each of the embodiments described below shows a comprehensive or specific example in the present invention. Numerical values, shapes, materials, components, placement and connection of the components, steps and their order, and the like are mere examples and are not intended to limit the present invention. Components in the following embodiments not mentioned in any of the independent claims that define the broadest concepts are described as optional elements.

Note that the drawings are schematic diagrams and do not necessarily provide strictly accurate illustrations. In the drawings, components that are substantially the same as components described previous thereto have the same reference numerals and overlapping descriptions may be omitted or simplified.

Embodiment

Hereinafter, the embodiment will be described with reference to FIG. 1 to FIG. 10.

1. Configuration

Figure 2:
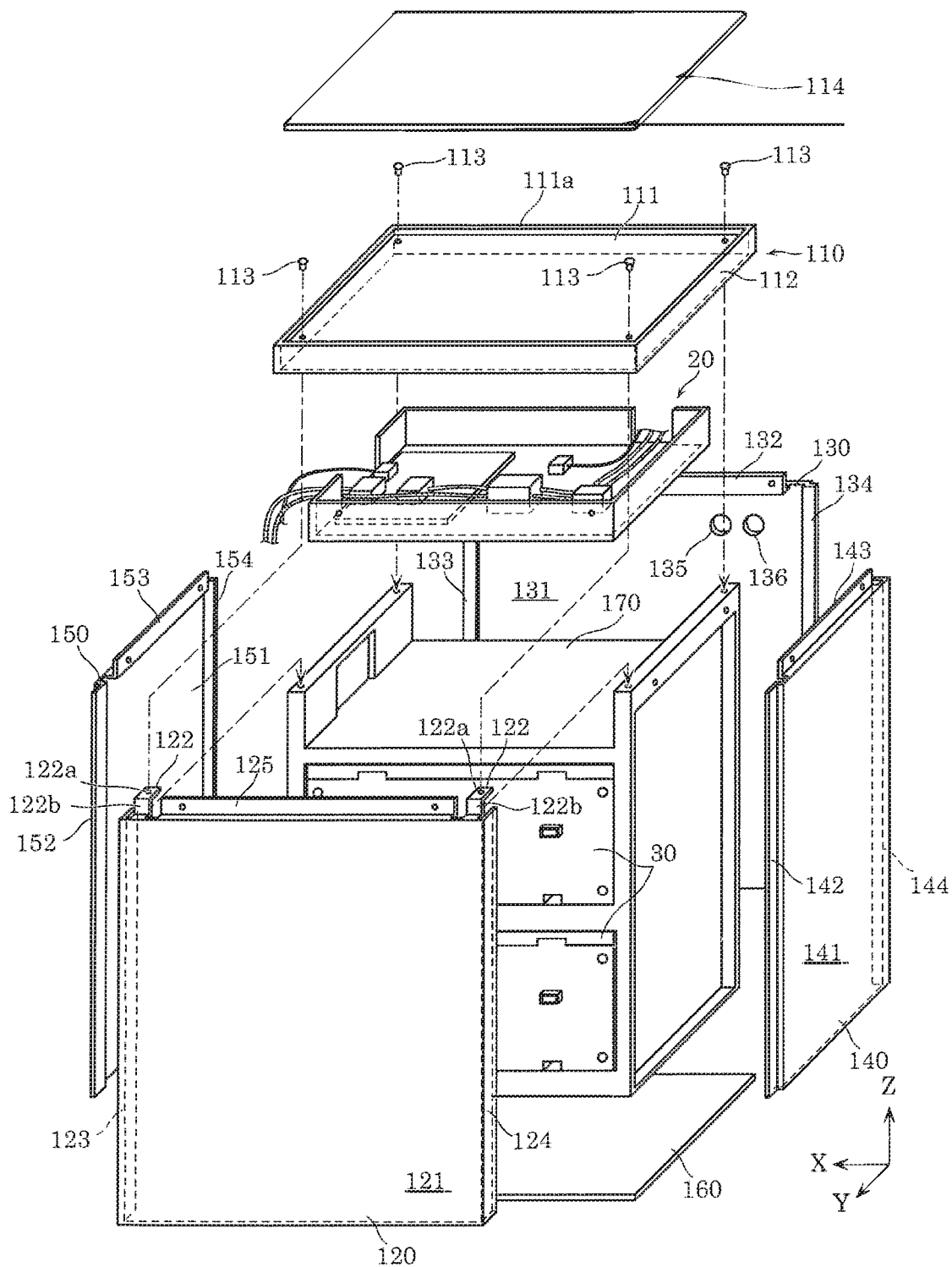
FIG. 2 is an exploded perspective view of a casing of the storage battery unit and a unit circuit.

FIG. 1 is a perspective view of an example of an exterior of a storage battery unit according to the embodiment. FIG. 2 is an exploded perspective view of an exterior body of the storage battery unit and a unit circuit.

Note that in these and subsequent drawings, the Y-axis is the front-back direction, the positive end of the Y-axis (front end of arrow) is the front side, and the negative end of the Y-axis (rear end of arrow) is the rear side for the sake of description. The Z-axis is the top-bottom direction, the positive end of the Z-axis (front end of arrow) is the top side, and the negative end of the Z-axis (rear end of arrow) is the bottom side. The X-axis is defined by applying the Y-axis and the Z-axis as defined above to a right-handed coordinate system. In other words, the direction perpendicular to the Y-axis and the Z-axis (left-right direction) is the Y-axis, the positive end of the X-axis (front end of arrow) is the left side, and the negative end of the X-axis (rear end of arrow) is the right side.

As illustrated in FIG. 1 and FIG. 2, storage battery unit 1 includes casing 10, unit circuit 20, and battery module 30. In the present embodiment, storage battery unit 1 includes two battery modules 30. In storage battery unit 1, for example, unit circuit 20 and the two battery modules 30 are connected in series.

Each of the two battery modules 30 includes cells, and is a secondary battery that can be charged with electric power and discharge the electric power. Battery module 30 may be a lithium-ion secondary battery, and may also be a lead storage battery. A specific configuration of battery module 30 will be described later.

Note that storage battery unit 1 is not limited to including the two battery modules 30, but may also include one battery module 30 and at least three battery modules 30.

Unit circuit 20 is electrically connected to the two battery modules 30, routinely measures a temperature, electric current, voltage, etc. as information indicating a state of the cells included in the two battery modules 30, and report a measurement result to an external electric power conversion device 2. The external electric power conversion device 2 determines a permissible electric current value and voltage based on the report from unit circuit 20, and controls the charge and discharge to be within a determined value range. Unit circuit 20 monitors for anomalies inside storage battery unit 1, and interrupts electric current flowing in and out of storage battery unit 1 when it is determined an anomaly is present. A specific configuration of unit circuit 20 will be described later.

Configuration of Casing

A specific configuration of casing 10 will be described.

Figure 3:
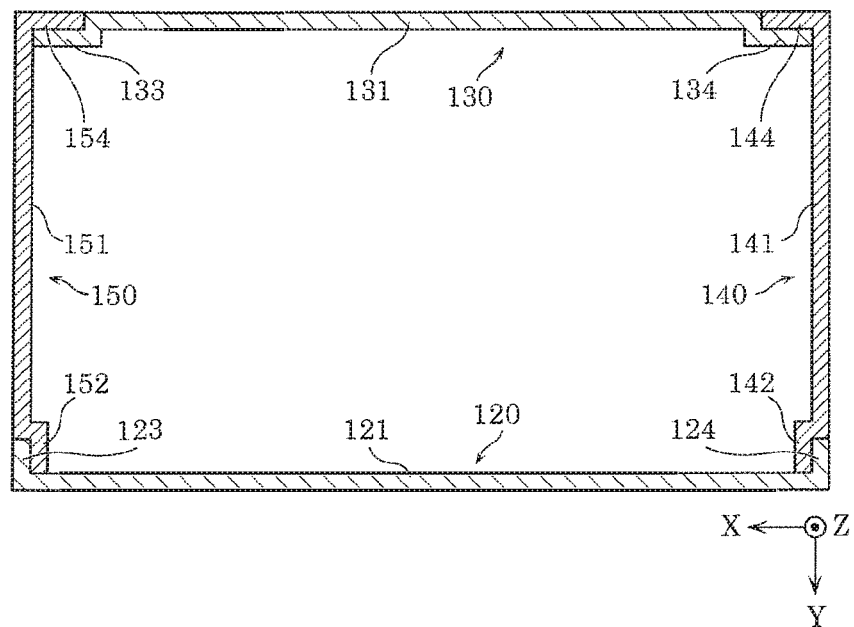
FIG. 3 is a cross-sectional view of the casing of the storage battery unit along line in FIG. 1.
Figure 4:
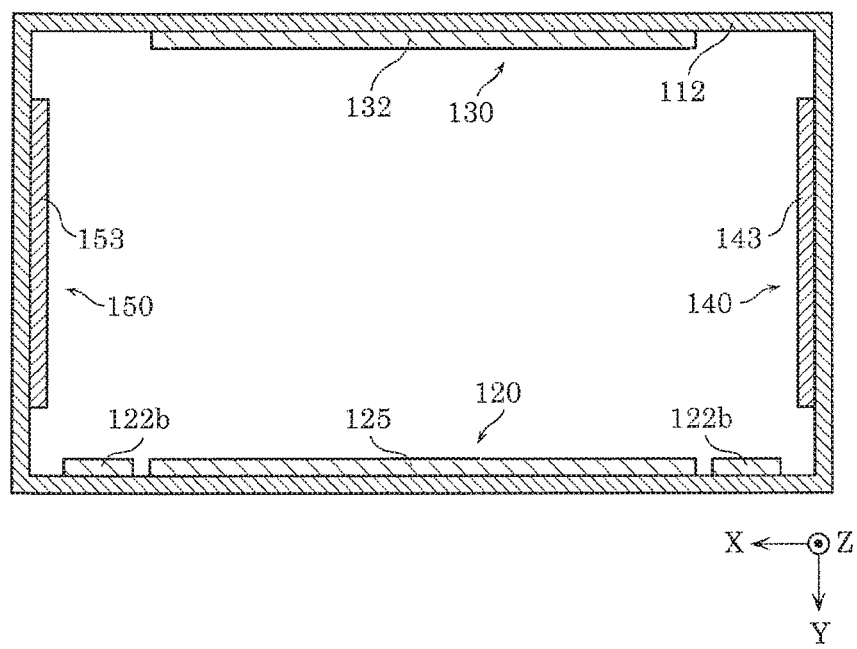
FIG. 4 is a cross-sectional view of the casing of the storage battery unit along line IV-IV in FIG. 1.
Figure 5:
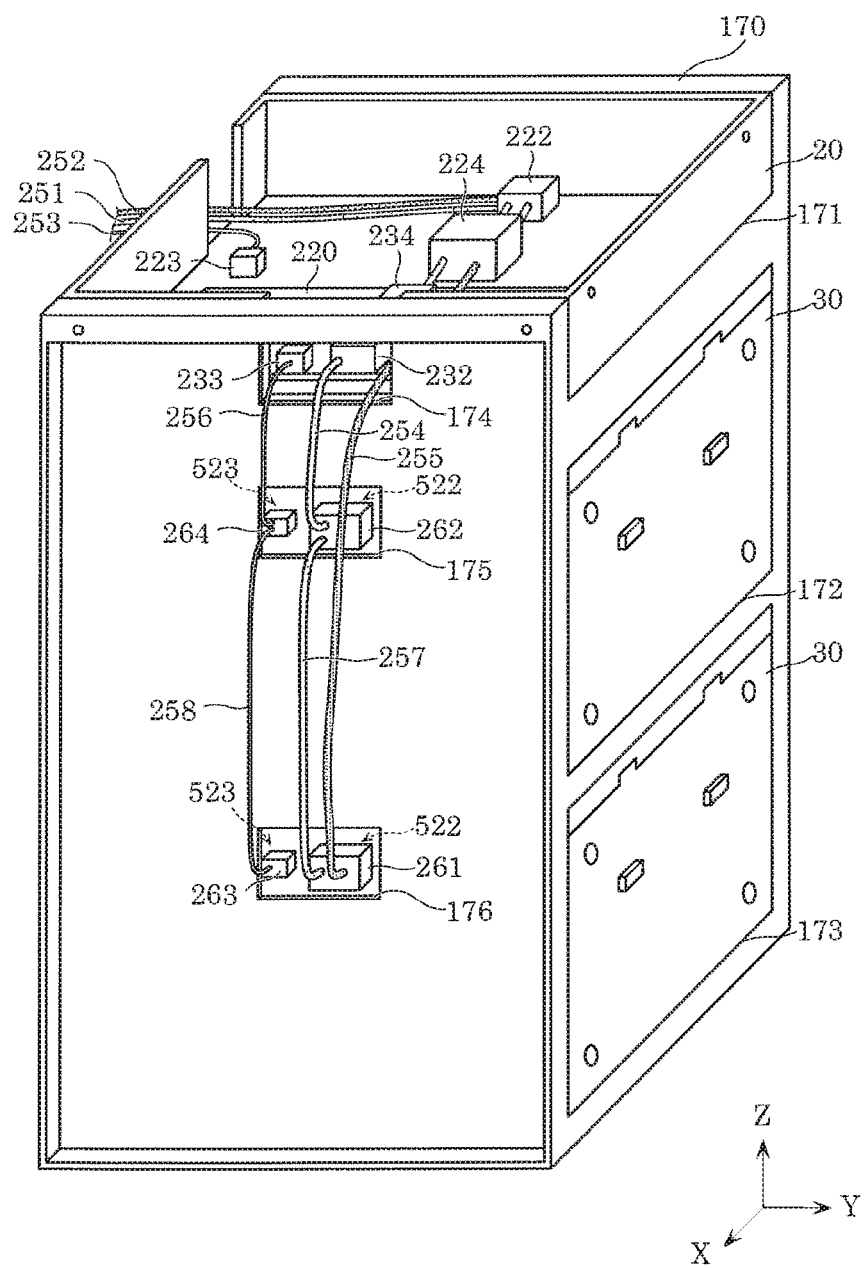
FIG. 5 is a perspective view of an example of the exterior of the storage battery unit without the casing.

FIG. 3 is a cross-sectional view of the casing of the storage battery unit along line III-III in FIG. 1. FIG. 4 is a cross-sectional view of the casing of storage battery unit along line IV-IV in FIG. 1. FIG. 5 is a perspective view of the storage battery unit without tabular components. Note that FIG. 3 and FIG. 4 are cross-sectional views of a configuration without casing 10. FIG. 3 is a cross-sectional view of a portion of lateral plates of storage battery unit 1 cut along the XY-plane. In other words, FIG. 3 shows a positional relationship between lateral plates 120 to 150 of storage battery unit 1. FIG. 4 is a cross-sectional view of a portion of top plate 110 of the storage battery unit cut along the XY-plane. In other words, FIG. 4 shows a positional relationship between top plate 110 and each of lateral plates 120 to 150 of storage battery unit 1.

As illustrated in FIG. 1 to FIG. 4, casing 10 includes the tabular components. The tabular components include top plate 110 disposed on a top surface of storage battery unit 1, bottom plate 160 disposed on a bottom surface of storage battery unit 1, and lateral plates 120 to 150 disposed on lateral surfaces excluding top plate 110 and bottom plate 160. Casing 10 may further include support rack 170 that supports unit circuit 20 and battery module 30.

Top Plate

Top plate 110 includes first top plate portion 111. First top plate portion 111 substantially covers the entire top surface of storage battery unit 1, and is, for example, rectangular and tabular. Top plate 110 may further include second top plate portion 112. Second top plate portion 112 is disposed along lateral plates 120 to 150, and is a square tubular portion that includes four mutually connected tabular portions extending downward from four sides of first top plate portion 111.

Note that second top plate portion 112 does not need to be square tubular by including four mutually connected tabular portions as long as the tabular portions extend downward from the four sides of first top plate portion 111. Second top plate portion 112 may be a tabular portion that extends downward from three sides, two sides, or one side among the four sides of first top plate portion 111 as long as the tabular portions extend downward from any one side of the four sides of first top plate portion 111. Second top plate portion 112 has a configuration in which one tabular portion extends downward from one side among the four sides of first top plate portion 111, but may also have a configuration in which at least two tabular portions extend downward from one side. Top plate 110 includes, for example, a metal or a resin.

Top plate 110 is fixed to support rack 170 with fastening components 113, e.g. screws. A tabular cover component 114 is disposed on a top portion of top plate 110. Cover component 114 covers fastening components 113 by covering a top surface of top plate 110 that is fixed with fastening components 113. In other words, fastening components 113 are disposed in positions that are not exposed from casing 10.

A space that engages with cover component 114 may be disposed at a top side of top plate 110. In other words, the top side of top plate 110 may include protrusion 111a that protrudes upward from the four sides of first top plate portion 111 for only the same amount as a thickness of cover component 114. Cover component 114 includes, for example, a metal or a resin.

Bottom Plate

Bottom plate 160 is a tabular component that substantially covers the entire bottom surface of storage battery unit 1. Bottom plate 160 is fixed to support rack 170 with, for example, fastening components (not illustrated in the drawings), e.g. screws. Bottom plate 160 includes, for example, a metal or a resin.

Lateral Plates

The lateral plates include front plate 120 disposed on a front surface of storage battery unit 1, rear plate 130 disposed on a rear surface of storage battery unit 1, right plate 140 disposed on a right side surface of storage battery unit 1, and left plate 150 disposed on a left side surface of storage battery unit 1.

Front Plate

Front plate 120 includes first front plate portion 121 and fixing component 122. First front plate portion 121 substantially covers the entire front surface of storage battery unit 1, and is, for example, rectangular and tabular. Fixing component 122 is tabular and is connected to first front plate portion 121. Fixing component 122 is disposed along first top plate portion 111. Fixing component 122 is connected via connection portion 122b that extends upward from a top portion of first front plate portion 121, and extends rearward from a top end portion of connection portion 122b. Fixing component 122 is not limited to being connected via connection portion 122b, and may also be directly connected to the top portion of first front plate portion 121.

Fixing component 122 includes through-hole 122a. In the present embodiment, two fixing components 122 are connected to left and right ends of the top end portion of first front plate portion 121. Note that fixing component 122 is not limited to being two fixing components connected to the top end portion of first front plate portion 121, and may also be one or at least three fixing components connected to the top end portion of first front plate portion 121. In case of one fixing component 122, fixing component 122 may be disposed across a whole span of the top end portion of first front plate portion 121 along the left-right direction.

Front plate 120 is fixed to top plate 110 and support rack 170 by fastening components 113 being screwed into support rack 170 in a state in which fastening components 113 pass through through-holes 122a of fixing components 122 and through-holes of first top plate portion 111 of top plate 110. With this, fixing components 122 of front plate 120 and the bottom surface of first top plate portion 111 are fixed to each other.

Note that fixing components 122 of front plate 120 and the bottom surface of first top plate portion 111 do not need to be fixed to each other. In other words, fastening components 113 pass through through-holes 122a of fixing components 122 of front plate 120 and the through-holes of first top plate portion 111, but are not limited thereto. For example, fixing components 122 of front plate 120 may be fixed separately to only support rack 170.

Note that first top plate portion 111 of top plate 110 and fixing components 122 of front plate 120 are fixed directly to support rack 170 by fastening components 113 being screwed into support rack 170 in a state in which fastening components 113 pass through first top plate portion 111 and fixing component 122, but are not limited thereto. For example, first top plate portion 111 and fixing component 122 may be indirectly fixed to support rack 170 by engaging fastening components 113 with components fixed to support rack 170. In other words, the lateral plates include first front plate portion 121 as a first lateral plate portion that substantially covers the entire front surface of storage battery unit 1 as the lateral surface of storage battery unit 1, and fixing components connected to the first lateral plate portion.

First top plate portion 111 of top plate 110 and fixing components 122 of front plate 120 are fixed to support rack 170 with fastening components 113, but each may also be directly or indirectly fixed separately to support rack 170 with fastening components 113.

Front plate 120 may further include second front plate portions 123 and 124. Second front plate portion 123 is a tabular portion along the left side surface of storage battery unit 1. Second front plate portion 123 extends rearward from a left side of first front plate portion 121. Second front plate portion 124 is a tabular portion along the right side surface of storage battery unit 1. Second front plate portion 124 extends rearward from a right side of first front plate portion 121. Second front plate portions 123 and 124 may be disposed across a whole span of first front plate portion 121 along the top-bottom direction. This makes it possible to improve stiffness of front plate 120.

Front plate 120 may further include third front plate portion 125. As illustrated in FIG. 4, third front plate portion 125 is a tabular portion disposed more inwardly than second top plate portion 112 of top plate 110. In other words, third front plate portion 125 is disposed more toward the rear side than a front side portion of second top plate portion 112. Third front plate portion 125 is disposed more upward than first front plate portion 121 and offset more rearward. The top end portion of first front plate portion 121 and a bottom end portion of third front plate portion 125 are connected along the front-back direction.

Third front plate portion 125 is disposed between the two fixing components 122, and may be disposed across a whole span of a portion, among the top end portion of first front plate portion 121, between the two fixing components 122 along the left-right direction. In this manner, since third front plate portion 125 is offset more than first front plate portion 121 and connected to first front plate portion 121 along the front-back direction, it is possible to improve the stiffness of front plate 120.

Third front plate portion 125 is fixed to a front surface of unit circuit 20 that is fixed to support rack 170 with fastening components (not illustrated in the drawings), e.g. screws. Note that third front plate portion 125 is not limited to being fixed to support rack 170 via unit circuit 20, and may also be directly fixed to support rack 170.

Since third front plate portion 125 is disposed more inwardly than second top plate portion 112, the fastening components fixed to third front plate portion 125 are covered by second top plate portion 112. In other words, the fastening components are disposed in positions that are not exposed from casing 10.

Front plate 120 includes, for example, a metal or a resin.

Left and Right Plates

Right plate 140 includes first right plate portion 141 and second right plate portion 142. First right plate portion 141 is, for example, a tabular portion that substantially covers the entire right side surface of storage battery unit 1. As illustrated in FIG. 3, second right plate portion 142 is disposed more inwardly than second front plate portion 124 of front plate 120. In other words, second right plate portion 142 is disposed more toward the left side than second front plate portion 124. Second right plate portion 142 is disposed more frontward than first right plate portion 141 and offset more leftward. A front end portion of first right plate portion 141 and a rear end portion of second right plate portion 142 are connected along the left-right direction.

Second right plate portion 142 may be disposed across a whole span of the front end portion of first right plate portion 141 along the top-bottom direction. In this manner, since second right plate portion 142 is offset more than first right plate portion 141 and connected to first right plate portion 141 along the left-right direction, it is possible to improve stiffness of right plate 140.

Second right plate portion 142 is fixed to a right side surface of support rack 170 with fastening components (not illustrated in the drawings), e.g. screws. Since second right plate portion 142 is disposed more inwardly than second front plate portion 124, the fastening components fixed to second right plate portion 142 are covered by second front plate portion 124. In other words, the fastening components are disposed in positions that are not exposed from casing 10.

Right plate 140 may further include third right plate portion 143. As illustrated in FIG. 4, third right plate portion 143 is a tabular portion disposed more inwardly than second top plate portion 112 of top plate 110. In other words, third right plate portion 143 is disposed more toward the left side than a right side portion of second top plate portion 112. Third right plate portion 143 is disposed more upward than first right plate portion 141 and offset more leftward. A top end portion of first right plate portion 141 and a bottom end portion of third right plate portion 143 are connected along the left-right direction.

Third right plate portion 143 may be disposed across a whole span of a top end portion of first right plate portion 141 along the front-back direction. In this manner, since third right plate portion 143 is offset more than first right plate portion 141 and connected to first right plate portion 141 along the left-right direction, it is possible to improve the stiffness of right plate 140.

Third right plate portion 143 is fixed to the right side surface of support rack 170 with fastening components (not illustrated in the drawings), e.g. screws. Since third right plate portion 143 is disposed more inwardly than second top plate portion 112, the fastening components fixed to third right plate portion 143 are covered by second top plate portion 112. In other words, the fastening components are disposed in positions that are not exposed from casing 10.

As long as third right plate portion 143 is fixed to support rack 170 with fastening components, second right plate portion 142 does not need to be fixed to support rack 170 with the fastening components.

Right plate 140 may further include fourth right plate portion 144. Fourth right plate portion 144 is a portion along the rear surface of storage battery unit 1.

Left plate 150 includes first left plate portion 151 and second left plate portion 152. Left plate 150 may further include third left plate portion 153. Left plate 150 may further include fourth left plate portion 154. Note that since a configuration of left plate 150 is the same as a horizontally-flipped configuration of right plate 140, detailed description thereof is omitted.

Right plate 140 and left plate 150 include, for example, a metal or a resin.

Rear Plate

Rear plate 130 includes first rear plate portion 131 and second rear plate portion 132. First rear plate portion 131 is, for example, a rectangular and tabular portion that substantially covers the entire rear surface of storage battery unit 1. As illustrated in FIG. 4, second rear plate portion 132 is disposed more inwardly than second top plate portion 112. In other words, second rear plate portion 132 is disposed more toward the front side than a rear side portion of second top plate portion 112. Second rear plate portion 132 is disposed more upward than first rear plate portion 131 and offset more frontward. A top end portion of first rear plate portion 131 and a bottom end portion of second rear plate portion 132 are connected along the front-back direction. The top portion of first rear plate portion 131 has openings 135 and 136 for a wiring of external electric power lines 251 and 252 and external communication line 253, which will be described later.

Second rear plate portion 132 may be disposed across a whole span of the top end portion of first rear plate portion 131 along the left-right direction. In this manner, since second rear plate portion 132 is offset more than first rear plate portion 131 and connected to first rear plate portion 131 along the front-back direction, it is possible to improve a stiffness of rear plate 130.

Second rear plate portion 132 is fixed to a rear surface of unit circuit 20 that is fixed to support rack 170 with, for example, fastening components (not illustrated in the drawings), e.g. screws. Note that second rear plate portion 132 is not limited to being fixed to support rack 170 via unit circuit 20, and may also be directly fixed to support rack 170.

Since second rear plate portion 132 is disposed more inwardly than second top plate portion 112, the fastening components fixed to second rear plate portion 132 are covered by second top plate portion 112. In other words, the fastening components are disposed in positions that are not exposed from casing 10.

Rear plate 130 may further include third rear plate portion 133 and fourth rear plate portion 134. As illustrated in FIG. 3, third rear plate portion 133 and fourth rear plate portion 134 are respectively disposed more inwardly than fourth left plate portion 154 of left plate 150 and fourth right plate portion 144 of right plate 140.

In other words, third rear plate portion 133 is disposed more toward the front side than fourth left plate portion 154. Third rear plate portion 133 is disposed more rightward than first rear plate portion 131 and offset more frontward. A left end portion of first rear plate portion 131 and third rear plate portion 133 are connected along the front-back direction.

Fourth rear plate portion 134 is disposed more toward the front side than fourth right plate portion 144. Fourth rear plate portion 134 is disposed more rightward than first rear plate portion 131 and offset more frontward. A right end portion of first rear plate portion 131 and fourth rear plate portion 134 are connected along the front-back direction.

Third rear plate portion 133 and fourth rear plate portion 134 may be respectively disposed across a whole span of the left end portion and the right end portion of first rear plate portion 131 along the top-bottom direction. In this manner, since third rear plate portion 133 and fourth rear plate portion 134 are offset more than first rear plate portion 131 and connected to first rear plate portion 131 along the front-back direction, it is possible to improve a stiffness of rear plate 130.

Third rear plate portion 133 and fourth rear plate portion 134 are fixed to a rear surface of support rack 170 with, for example, fastening components (not illustrated in the drawings), e.g. screws. Since third rear plate portion 133 and fourth rear plate portion 134 are respectively disposed more inwardly than fourth left plate portion 154 and fourth right plate portion 144, the fastening components fixed to third rear plate portion 133 and fourth rear plate portion 134 are respectively covered by fourth left plate portion 154 and fourth right plate portion 144. In other words, the fastening components are disposed in positions that are not exposed from casing 10.

Rear plate 130 includes, for example, a metal or a resin.

Support Rack

FIG. 5 is a perspective view of the storage battery unit without the tabular components.

Support rack 170 includes top section 171, middle section 172, and bottom section 173. Unit circuit 20 is fixed to top section 171, and the two battery modules 30 are fixed to middle section 172 and bottom section 173. In other words, unit circuit 20 and the two battery modules 30 are arranged along the Z-axis and supported by support rack 170. A wall of support rack 170 at the positive end of the X-axis has openings 174 to 176 for respectively connecting wires to unit circuit 20 and the two battery modules 30.

Middle section 172 and bottom section 173 may be configured to make it possible to replace each battery module 30 with a new one when the fixed battery modules 30 become defective. Middle section 172 and bottom section 173 may be configured to make it possible to move and fix battery module 30, which is temporarily fixed to bottom section 173, to middle section 172. Middle section 172 and bottom section 173 may be configured to make it possible to move and fix battery module 30, which is temporarily fixed to middle section 172, to bottom section 173. Since warm air generally gathers more easily higher up, a temperature difference occurs in the top portion and the bottom portion. Therefore, a difference in deterioration degree accompanied by the temperature difference between battery module 30 disposed in the top portion and battery module 30 disposed in the bottom portion occurs. It is possible to limit the difference in deterioration degree by replacing the location of battery module 30 after a predetermined period has passed.

As stated above, top plate 110, front plate 120, rear plate 130, right plate 140, left plate 150, and bottom plate 160 are fixed to support rack 170. Female screws are disposed in support rack 170 with which fastening components, which fix top plate 110, front plate 120, rear plate 130, right plate 140, left plate 150, and bottom plate 160, engage.

Configuration of Unit Circuit

A specific configuration of unit circuit 20 will be described next with reference to FIG. 6.

Unit circuit 20 includes second terminal 221. Second terminal 221 is connected to the external electric power conversion device 2 (see FIG. 10) by external electric power lines 251 and 252, and external communication line 253. To be specific, second terminal 221 includes electric power line terminal 222 to which external electric power lines 251 and 252 are connected, and communication line terminal 223 to which external communication line 253 is connected. Electric power line terminal 222 and communication line terminal 223 are disposed on unit circuit 20 at the negative end of the X-axis.

Electric power line terminal 222 is a terminal for outputting (discharging) the electric power stored in battery module 30 and inputting (charging) external electric power to battery module 30. In other words, electric power line terminal 222 is connected to an external device that becomes a load, is connected to a device, system power supply, or the like that outputs electric power of a power generation device and the like via electric power conversion device 2, etc.

Communication line terminal 223 is a terminal for obtaining a control signal from an external device, outputting a signal that indicates a state of storage battery unit 1 to the external device, etc. Communication line terminal 223 is electrically connected to unit circuit board 220. Unit circuit board 220 obtains the control signal from the external device via communication line terminal 223, outputs the signal indicating the state of storage battery unit 1 via communication line terminal 223, etc.

Unit circuit 20 may further include third terminal 231. Third terminal 231 includes electric power line terminal 232 that is connected to the other end of electric power line 254 having an end connected to battery module 30, and communication line terminal 233 that is connected to the other end of communication line 256 having an end connected to battery module 30. Electric power line terminal 232 and communication line terminal 233 are disposed on unit circuit 20 at the positive end of the X-axis. In other words, third terminal 231 is connected to the other end of electric power line 254 and is disposed more toward the left side surface of storage battery unit 1.

Unit circuit 20 may further include unit circuit board 220 and breaker 224.

Unit circuit board 220 is connected to the two battery modules 30 by being connected to electric power line 254 and communication line 256 via third terminal 231. Unit circuit board 220 includes a control circuit for managing the discharging of the two battery modules 30 and the charging of the two battery modules 30. For example, third terminal 231 and fourth terminal 234 are mounted on unit circuit board 220. Fourth terminal 234 is connected to a positive electrode-end electric power line, and the electric power line is connected to breaker 224.

Breaker 224 interrupts the electric current when more electric current is flowing than a predetermined electric current.

Unit circuit 20 may further include box 210. Box 210 is a bottomed square tubular component that accommodates unit circuit board 220, breaker 224, and second terminal 221. Box 210 includes female screws 211 in a wall at the positive end of the Y-axis with which the fastening components engage for fixing the top portion of third front plate portion 125 of front plate 120. Box 210 has opening 212 for wiring external electric power lines 251 and 252, and external communication line 253 connected to second terminal 221 exteriorly of unit circuit 20. Box 210 has opening 213 for wiring electric power lines 254 and 255, and communication line 256 connected to third terminal 231 to battery module 30.

Configuration of Battery Module

A specific configuration of casing 30 will be described next.

Figure 7:
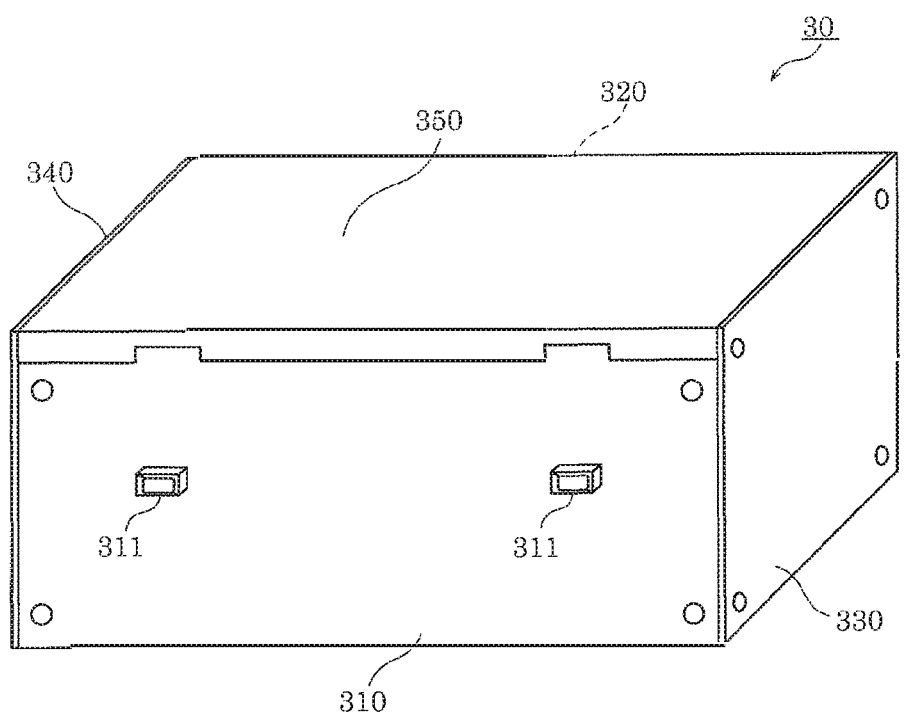
FIG. 7 is a perspective view of an example of an exterior of a battery module.
Figure 7:
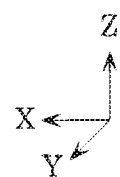
Figure 8:
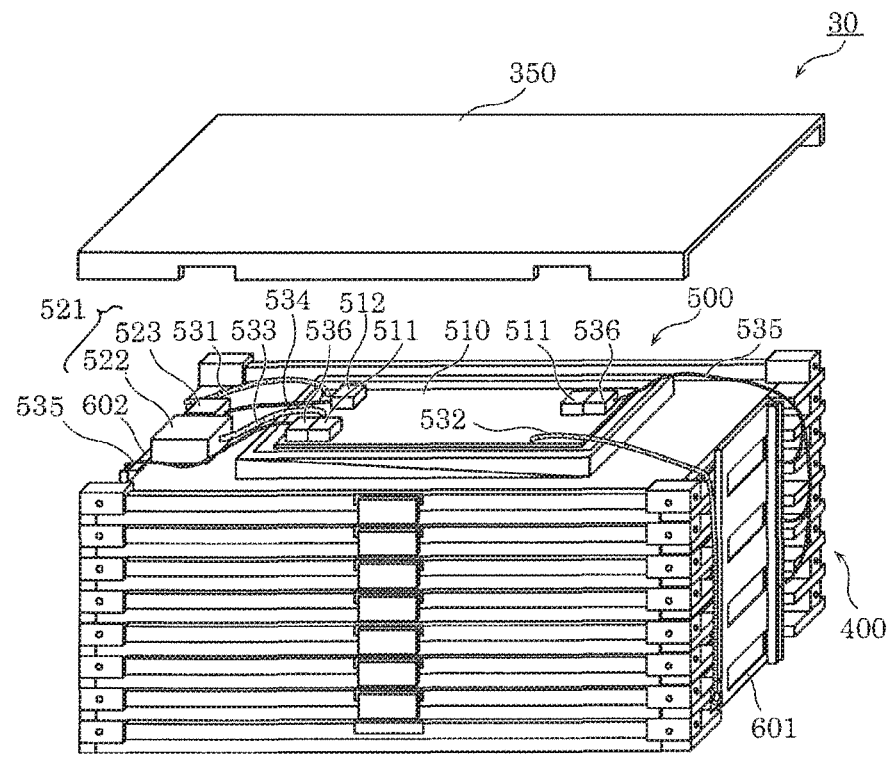
FIG. 8 is an exploded perspective view of an example of an exterior body of the battery module.
Figure 8:
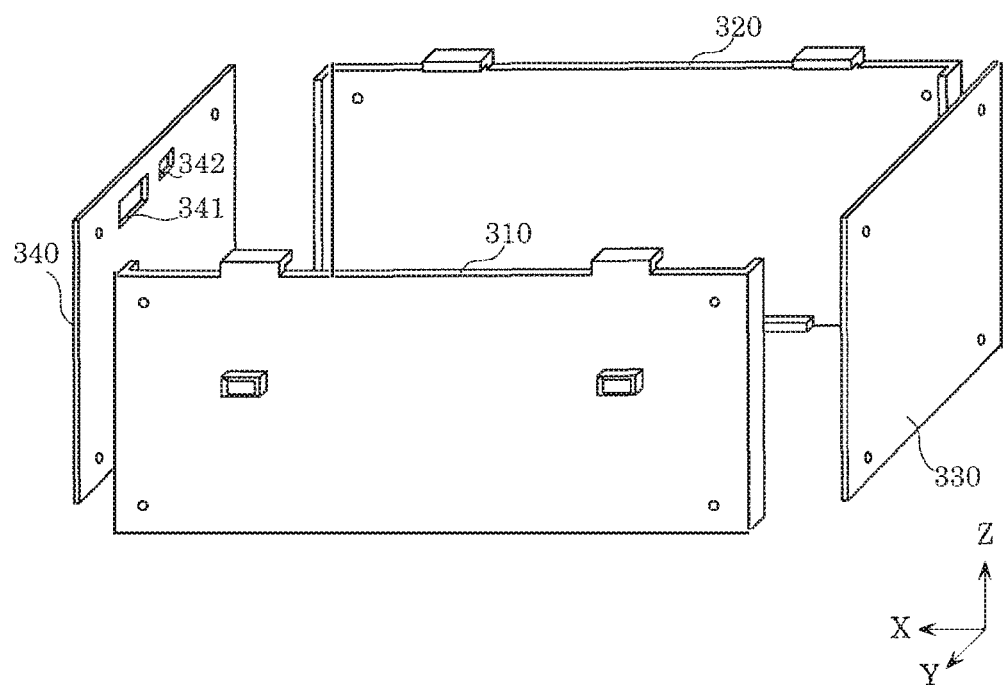
Figure 9:
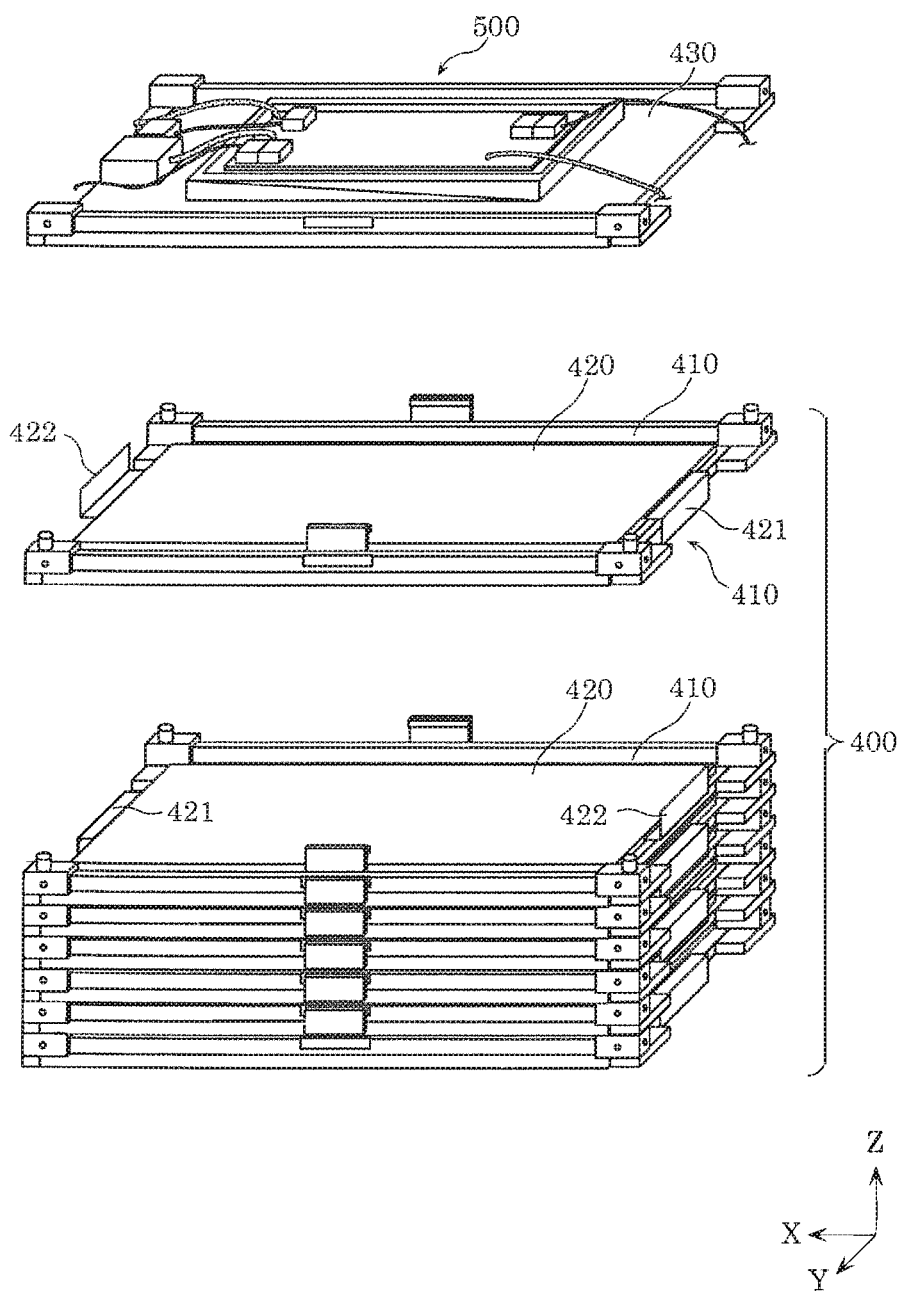
FIG. 9 is an exploded perspective view for describing a battery stack.

FIG. 7 is a perspective view of an example of an exterior of the battery module. FIG. 8 is an exploded perspective view of an exterior body of the battery module. FIG. 9 is an exploded perspective view for describing a battery stack.

As illustrated in FIG. 7 to FIG. 9, battery module 30 includes module reinforcement plates 310 to 340, lid 350, module circuit 500, battery stack 400, and first terminal 521.

Module reinforcement plate 310 is a metallic and tabular component disposed on battery module 30 at the positive end of the Y-axis. Module reinforcement plate 310 is disposed in at least a position, included in positions that cover outer surfaces (lateral surfaces) excluding a pair of outer surfaces (top surface and bottom surface) at both outer sides along a lamination direction (Z-axis) of battery stack 400, that covers an entire outer surface (in the present embodiment, outer surface at the positive end of the Y-axis) having a maximum area. Outer surfaces excluding a pair of outer surfaces at both outer sides along a lamination direction (Z-axis) of battery stack 400 here means the lateral surfaces that intersect (in the present embodiment, are orthogonal) with the top surface and bottom surface that are the pair of outer surfaces. Note that module reinforcement plate 310 does not strictly need to cover the entire outer surface of battery stack 400 at the positive end of the Y-axis, and may also, for example, expose a portion of at most 10% of the entire surface. Module reinforcement plate 310 has a substantially rectangular contour in a plan view.

Module reinforcement plate 310 may include protrusion 311 protruding toward the positive end of the Y-axis. Two protrusions 311 are disposed along the X-axis and are, for example, substantially cuboid. Protrusion 311 may be a portion formed by performing a stamping treatment on the metallic, tabular component including module reinforcement plate 310. In other words, a side opposite to protrusion 311 (negative end of Y-axis) may include recesses corresponding to the shape of each protrusion 311. Protrusion 311 is not limited to being two protrusions, but may also be one protrusion and may also be at least three protrusions.

Module reinforcement plate 320 is a metallic and tabular component disposed on battery module 30 at the negative end of the Y-axis. Module reinforcement plate 320 faces module reinforcement plate 310 and substantially covers the entire outer surface of battery stack 400 at the negative end of the Y-axis. Module reinforcement plate 320 differs from module reinforcement plate 310 in that module reinforcement plate 320 is disposed on the opposite side of battery stack 400 and does not include protrusion 311.

Module reinforcement plate 330 is a metallic and tabular component disposed on battery module 30 at the negative end of the X-axis. Module reinforcement plate 330 covers the outer surface of battery stack 400 at the negative end of the X-axis. The outer surface at the negative end of the X-axis is a lateral surface, among the lateral surfaces, not having a maximum area. Module reinforcement plate 330 is fixed to battery stack 400 by fastening components, e.g. screws, being fixed to battery stack 400 in a state in which the fastening components pass through four through-holes.

Module reinforcement plate 340 is a metallic and tabular component disposed on battery module 30 at the positive end of the X-axis. Module reinforcement plate 340 faces module reinforcement plate 330 and covers the outer surface of battery stack 400 at the positive end of the X-axis. The outer surface at the positive end of the X-axis is a lateral surface, among the lateral surfaces, not having a maximum area. Module reinforcement plate 340 is a rectangular and tabular component, and has openings 341 and 342 that expose first terminal 521. Opening 341 exposes electric power line terminal 522 of first terminal 521. Opening 342 exposes communication line terminal 523 of first terminal 521. Module reinforcement plate 340 is fixed to battery stack 400 with fastening components, e.g. screws, similar to module reinforcement plate 330.

Lid 350 is a metallic and tabular component disposed on battery module 30 at the positive end of the Z-axis. Lid 350 covers module circuit 500 disposed on battery stack 400 at the positive end of the Z-axis. Lid 350 has a substantially rectangular contour in the plan view.

Module reinforcement plates 310 to 340 are disposed in positions that cover the outer surfaces (lateral surfaces) excluding the pair of outer surfaces (top surface and bottom surface) at both outer sides along the lamination direction (Z-axis) of battery stack 400. In other words, module reinforcement plates 310 to 340 may also not cover the outer surfaces at both sides of battery stack 400 along the Z-axis.

As illustrated in FIG. 9, battery stack 400 is an assembly of the tabular cells 420 laminated on one another. To be specific, battery stack 400 is an assembly of plates as single unit that each include one cell 420 and tabular tray 410 to which a main surface of the one cell 420 is fixed. In other words, battery stack 400 is an assembly of cell 420 and tabular tray 410 being alternatingly laminated on each other. In battery stack 400, in two adjacent cells 420 among cells 420 laminated on one another, positive electrode terminal 421 of one cell 420 and negative electrode terminal 422 of another cell 420 are respectively electrically connected to each other by connection units 601 and 602.

An interior of cell 420 includes a power generation element in which a rectangular positive electrode, separator, negative electrode, and separator are respectively and repeatedly laminated on one another. Cell 420 includes, for example, a laminate that covers an outer surface of the power generation element. In other words, an exterior body of cell 420 includes the laminate. Cell 420 includes positive electrode terminal 421 that is electrically connected to the positive electrode of the power generation element and exposed at the negative or positive end of the X-axis, and negative electrode terminal 422 that is electrically connected to the negative electrode of the power generation element and exposed at the positive or negative end of the X-axis. Positive electrode terminal 421 and negative electrode terminal 422 are metallic and tabular components.

In the present embodiment, cell 420 has a configuration in which positive electrode terminal 421 and negative electrode terminal 422 are exposed at opposite ends of the X-axis, but is not limited to this configuration, and may have a configuration in which the positive electrode terminal and the negative electrode terminal are exposed at the same side. The positive electrode terminal and the negative electrode terminal may also be disposed in overlapping positions in a top view when multiple cells are vertically stacked on one another. For example, cell 420 may have a configuration in which positive electrode terminals and negative electrode terminals are disposed in point-symmetric positions, so that the positive electrode terminal of one cell and the negative electrode terminal of another cell overlap and the negative electrode terminal of the one cell and the positive electrode terminal of the other cell overlap when the one cell and the other cell that is the one cell upside down are stacked on each other. This makes it possible to easily connect multiple cells in series.

As illustrated in FIG. 8, module circuit 500 includes module circuit board 510 and first terminal 521. Module circuit 500 is connected to (i) electric power lines 531 and 532 for inputting and outputting electric power to and from cells 420, and (ii) communication lines 534 and 535 for inputting and outputting information about cells 420.

Module circuit board 510 is disposed on tabular tray 430 that is a tabular component covering the top surface of battery stack 400. Tabular tray 430 is disposed at the top surface of battery stack 400. Module circuit board 510 includes a control circuit that controls an output of the electric power stored in battery stack 400, performs charge control of battery stack 400, etc. To be specific, module circuit board 510 includes input-output terminal 511 that is electrically connected to the electrode terminal of each cell 420. Input-output terminal 511 is electrically connected to the electrode terminal of each cell 420 in order to obtain an intermediate potential of battery stack 400.

First terminal 521 includes electric power line terminal 522 and communication line terminal 523.

Electric power line terminal 522 is a terminal for outputting the electric power (discharge) stored in battery stack 400, inputting external electric power (charge) supplied from unit circuit 20 to battery stack 400, etc. Electric power line terminal 522 is electrically connected to module circuit board 510 by electric power line 533, and is electrically connected, via module circuit board 510, to (i) a positive electrode terminal of the cell located at an end portion of battery stack 400 near its positive electrode (hereinafter referred to as "positive electrode terminal of battery stack 400") and (ii) a negative electrode terminal of the cell located at an end portion of battery stack 400 near its negative electrode (hereinafter referred to as "negative electrode terminal of battery stack 400").

Module circuit board 510 is electrically connected to the positive electrode terminal of battery stack 400 by positive electrode electric power line 531 and to the negative electrode terminal of battery stack 400 by negative electrode electric power line 532. Note that electric power line terminal 522 is electrically connected to the positive electrode terminal and the negative electrode terminal of battery stack 400 via module circuit board 510, but is not limited thereto, and may also be directly electrically connected to the positive electrode terminal and the negative electrode terminal of battery stack 400 by each power line.

Components connected to each electrode terminal of cells 420 of connection units 601 and 602 are electrically connected to two input-output terminals 511 mounted on module circuit board 510 via the two communication lines 534 and 535. This enables module circuit board 510 to obtain the intermediate potential of battery stack 400.

Communication line terminal 523 is a terminal for obtaining the control signal from unit circuit 20, outputting a signal that indicates a state of battery module 30 to unit circuit 20, etc. Communication line terminal 523 is electrically connected by communication line 534 to connector 512 mounted on module circuit board 510. With this, module circuit board 510 obtains the control signal from unit circuit 20 via communication line terminal 523, and outputs the signal indicating the state of battery module 30 via communication line terminal 523.

Note that electric power line terminal 522 and communication line terminal 523 are disposed along the Y-axis on a surface at the positive end of the X-axis of battery module 30.

As illustrated in FIG. 9, tabular tray 430, which has the same configuration as tabular tray 410, is disposed on battery stack 400 at the positive end of the Z-axis. Tabular tray 430 corresponds to the tabular component. Module circuit 500 is disposed on tabular tray 430.

Module reinforcement plates 310 to 340 are fixed to tabular tray 430 disposed on battery stack 400 at the positive end of the Z-axis, and tabular tray 410 disposed on battery stack 400 at the negative end of the Z-axis. With this, module reinforcement plates 310 to 340 maintain a state in which cells 420 and tabular trays 410 and 430 included in battery stack 400 are laminated on one another.

Arrangement and Wiring of Terminals

A configuration relating to electrical connections between unit circuit 20 and the two battery modules 30 will be described next with reference to FIG. 5, FIG. 6, and FIG. 10.

Figure 10:
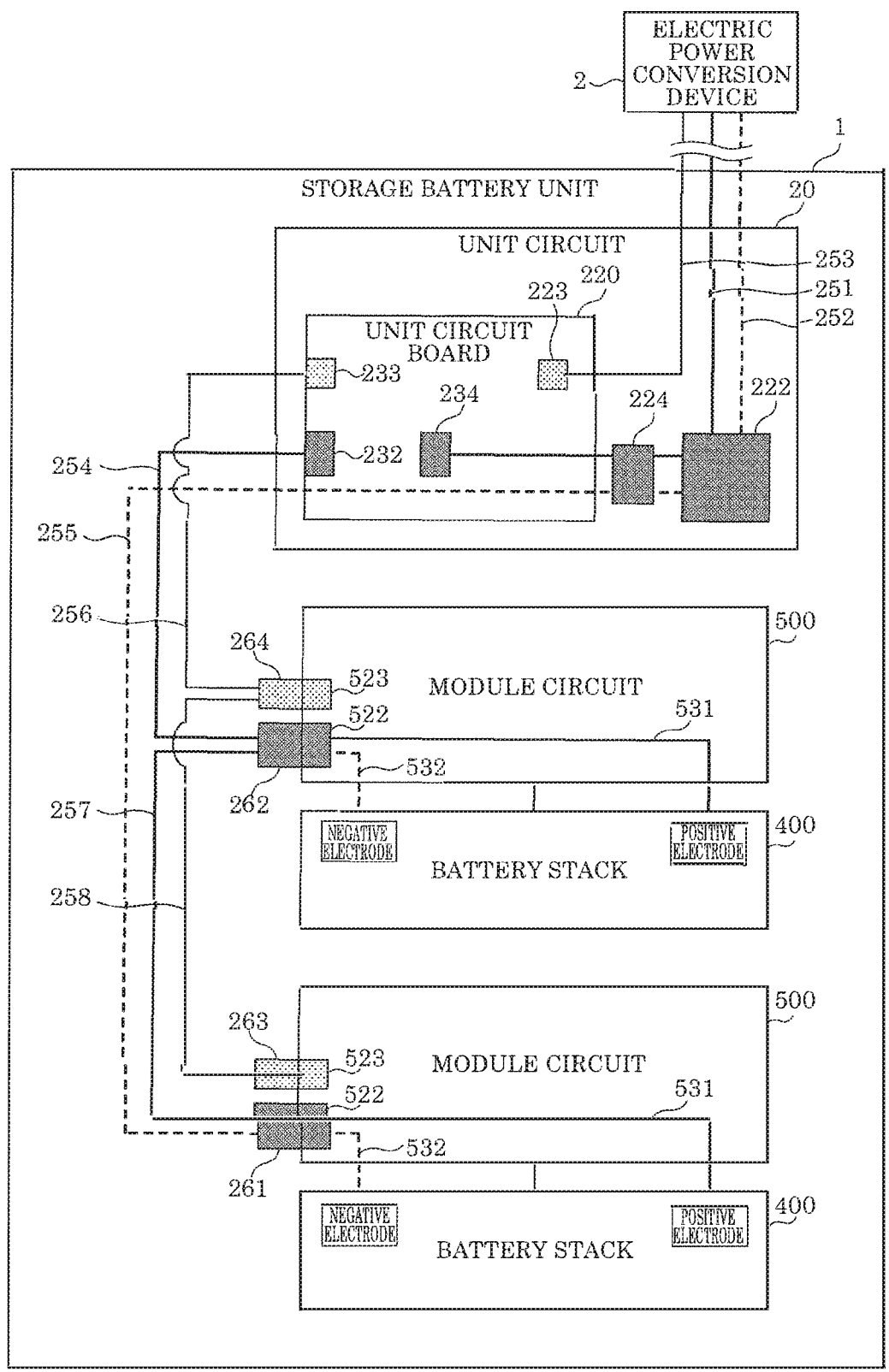
FIG. 10 is a schematic view for describing electrical connections of the storage battery unit.

FIG. 10 is a schematic view for describing the electrical connections of the storage battery unit.

Figure 6:
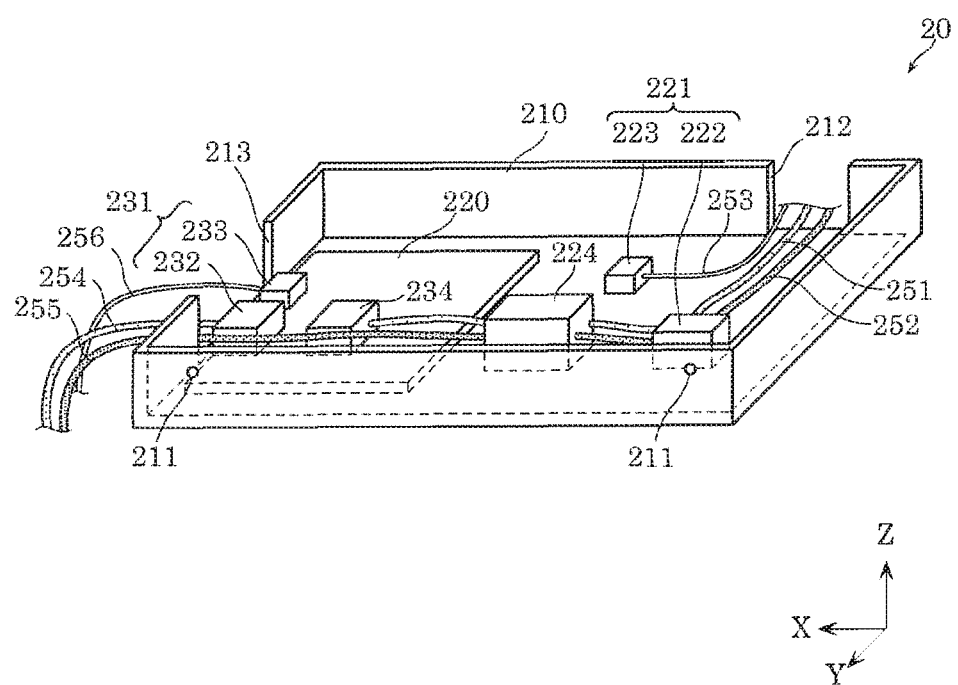
FIG. 6 is a perspective view of an example of an exterior of the unit circuit.

As illustrated in FIG. 5, FIG. 6, and FIG. 10, second terminal 221 included in unit circuit 20 is disposed at the right side surface of storage battery unit 1. In other words, electric power line terminal 222 and communication line terminal 223 included in second terminal 221 are disposed at the right side surface of storage battery unit 1.

The right side surface of storage battery unit 1 is one surface when (i) the Z-axis along which battery module 30 and unit circuit 20 are arranged is a vertical direction, and (ii) a pair of lateral surfaces facing each other, among a plurality of lateral surfaces excluding a top surface and a bottom surface of storage battery unit 1 when disposed, are a first surface and a second surface. Note that the left side surface of storage battery unit 1 is the other of the first surface and the second surface. Note that the front surface and the rear surface of storage battery unit 1 may be the pair of lateral surfaces.

Third terminal 231 included in unit circuit 20 is disposed at the left side surface, which is opposite to the right side surface at which second terminal 221 is disposed, of storage battery unit 1. In other words, electric power line terminal 232 and communication line terminal 233 included in third terminal 231 are disposed at the left side surface of storage battery unit 1.

Battery module 30 is disposed in an orientation in which first terminal 521 faces toward the left side surface of storage battery unit 1. With this, electric power line terminal 522 and communication line terminal 523 included in first terminal 521 are disposed at the left side surface of storage battery unit 1. Accordingly, second terminal 221 of unit circuit 20 is disposed on a side opposite to a side at which first terminal 521 included in battery module 30 is disposed.

Unit circuit 20 and the two battery modules 30 are connected by electric power lines 254, 255, and 257, and communication lines 256 and 258.

Electric power lines 254, 255, and 257 connect electric power line terminal 232 of unit circuit 20 and electric power line terminal 522 of module circuit 500. To be specific, electric power line 254 connects electric power line terminal 232 of unit circuit 20 and a positive electrode of battery module 30 disposed at the top side among the two battery modules 30. Electric power line 257 connects a negative electrode of battery module 30 disposed at the top side and a positive electrode of battery module 30 disposed at the bottom side among the two battery modules 30. Electric power line 255 connects a negative electrode of battery module 30 disposed at the bottom side and breaker 224 of unit circuit 20.

Note that electric power lines 254 and 257 include connector 262 that is connected to electric power line terminal 522 of the top side battery module 30. Electric power lines 255 and 257 include connector 261 that is connected to electric power line terminal 522 of the bottom side battery module 30. In this manner, the two battery modules 30 are connected to unit circuit 20 in a state in which they are connected in series.

Note that the two battery modules 30 may also be connected to unit circuit 20 in a state in which they are connected in parallel. When the storage battery unit includes at least three battery modules, the at least three battery modules may be connected to unit circuit in a state in which they are connected both in series and in parallel.

An end portion on a side opposite to connector 262 of electric power line 254 is directly connected to electric power line terminal 232 of unit circuit 20. Note that the end portion on the side opposite to connector 262 may be connected to electric power line terminal 232 via a connector.

An end portion on a side opposite to connector 261 of electric power line 255 is directly connected to breaker 224 of unit circuit 20. Note that the end portion on the side opposite to connector 261 may be connected to breaker 224 via a connector.

Communication lines 256 and 258 connect communication line terminal 233 of unit circuit 20 and communication line terminal 523 of module circuit 500. To be specific, communication line 256 connects communication line terminal 233 of unit circuit 20 and communication line terminal 523 of battery module 30 disposed at the top side among the two battery modules 30. Communication line 258 connects communication line terminal 523 of battery module 30 disposed at the top side and communication line terminal 523 of battery module 30 disposed at the bottom side among the two battery modules 30.

Note that communication lines 256 and 258 include connector 264 that is connected to communication line terminal 523 of the top side battery module 30. Communication line 258 includes connector 263 that is connected to communication line terminal 523 of the bottom side battery module 30. Note that a configuration of the communication lines is not limited to the above configuration as long as communication line terminal 233 of unit circuit 20 and communication line terminal 523 of each battery module 30 are connected.

As illustrated in FIG. 5, electric power line terminal 232 of unit circuit 20 is disposed at one side of communication line terminal 233 of unit circuit 20 in a horizontal direction (i.e., positive end of the Y-axis). Electric power line terminal 522 of battery module 30 is disposed at one side of communication line terminal 523 of battery module 30 in the horizontal direction (i.e., positive end of the Y-axis).

In this manner, in unit circuit 20 and battery module 30, since electric power line terminals 232 and 522 are disposed more toward the positive end of the Y-axis than communication line terminals 233 and 523 are, it is possible to wire electric power lines 254, 255, and 257, and communication lines 256 and 258 without their wires intersecting.

Electric power line terminal 232 and communication line terminal 233 of unit circuit 20, and electric power line terminal 522 and communication line terminal 523 of battery module 30 may be disposed as follows.

In other words, electric power line terminal 232 and communication line terminal 233 of unit circuit 20 are aligned in the horizontal direction (Y-axis). Electric power line terminal 522 and communication line terminal 523 of battery module 30 are aligned in the horizontal direction (Y-axis). Electric power line terminal 232 of unit circuit 20 and electric power line terminal 522 of battery module 30 are aligned in the vertical direction (Z-axis). Communication line terminal 233 of unit circuit 20 and communication line terminal 523 of battery module 30 are aligned in the vertical direction (Z-axis).

Second terminal 221 may be disposed on unit circuit 20 in an orientation in which second terminal 221 is connected, via the rear side, to external electric power lines 251 and 252 that are connected between second terminal 221 and electric power conversion device 2. In this case, electric power line terminal 232 is disposed at a side opposite to the rear side sandwiching communication line terminal 233.

2. Advantageous Effects, etc.

Storage battery unit 1 according to the present embodiment includes battery module 30, unit circuit 20, and casing 10. Battery module 30 includes cells 420 and module circuit 500. Electric power lines 531 and 532, and communication lines 534 and 535 are connected to module circuit 500. Electric power lines 531 and 532 input and output electric power to and from cells 420. Communication lines 534 and 535 input and output the information about cells 420. Unit circuit 20 is connected to module circuit 500 by electric power lines 254, 255, and 257, and communication lines 256 and 258. Unit circuit 20 is connected to the external electric power conversion device 2. Casing 10 accommodates battery module 30 and unit circuit 20. Casing 10 includes a plurality of tabular components. The plurality of tabular components include at least top plate 110 disposed on the top surface of storage battery unit 1, bottom plate 160 disposed on the bottom surface, and front plate 120 disposed on a lateral surface excluding the top surface and the bottom surface. Top plate 110 includes first top plate portion 111 that substantially covers the entire top surface. Front plate 120 includes first front plate portion 121 and fixing component 122. First front plate portion 121 substantially covers the entire front surface. Fixing component 122 is tabular and is connected to first front plate portion 121. Fixing component 122 is disposed along first top plate portion 111.

With this, fixing component 122 of front plate 120 makes it possible to easily detach front plate 120 when detaching fixing component 122 since fixing component 122 is disposed along first top plate portion 111.

In storage battery unit 1 according to the present embodiment, casing 10 further includes support rack 170 that supports battery module 30 and unit circuit 20. First top plate portion 111 and fixing component 122 respectively have the through-holes and through-hole 122a, and are fixed to each other by fastening components 113 being screwed into support rack 170 in a state in which fastening components 113 pass through the through-holes of first top plate portion 111 and through-hole 122a of fixing component 122.

This makes it possible to easily detach fixing component 122 of front plate 120 from a bottom surface of top plate 110 since fastening components 113 are fixed by being screwed into support rack 170.

In storage battery unit 1 according to the present embodiment, front plate 120 disposed on the front surface of storage battery unit 1, among lateral plates 120 to 150, includes fixing component 122.

Accordingly, it is possible to easily detach front plate 120 among lateral plates 120 to 150.

In storage battery unit 1 according to the present embodiment, top plate 110 further includes second top plate portion 112 along front plate 120. Front plate 120 further includes third front plate portion 125 disposed more inwardly than second top plate portion 112.

Rear plate 130 may further include second rear plate portion 132 disposed more inwardly than second top plate portion 112. Right plate 140 may further include third right plate portion 143 disposed more inwardly than second top plate portion 112. Left plate 150 may further include third left plate portion 153 disposed more inwardly than second top plate portion 112.

Accordingly, third front plate portion 125 of front plate 120, second rear plate portion 132 of rear plate 130, third right plate portion 143 of right plate 140, and third left plate portion 153 of left plate 150 are restricted in movement toward the outer sides of storage battery unit 1 by second top plate portion 112. Since third front plate portion 125, second rear plate portion 132, third right plate portion 143, and third left plate portion 153 are concealed by second top plate portion 112, it is possible to conceal fastening components with second top plate portion 112 when third front plate portion 125, second rear plate portion 132, third right plate portion 143, and third left plate portion 153 are fixed using the fastening components.

In storage battery unit 1 according to the present embodiment, front plate 120 disposed on the front surface of storage battery unit 1, among lateral plates 120 to 150, includes first front plate portion 121 that substantially covers the entire front surface of storage battery unit 1 as the first lateral plate portion, and second front plate portions 123 and 124 along the left side surface and right side surface of storage battery unit 1. Left plate 150 disposed on the left side surface, among lateral plates 120 to 150, includes first left plate portion 151 that substantially covers the entire left side surface as the first lateral plate portion, and second left plate portion 152 that is disposed more inwardly than second front plate portions 123 and 124 of front plate 120. Right plate 140 disposed on the right side surface, among lateral plates 120 to 150, includes first right plate portion 141 that substantially covers the entire right side surface as the first lateral plate portion, and second right plate portion 142 that is disposed more inwardly than second front plate portions 123 and 124 of front plate 120.

Accordingly, second right plate portion 142 of right plate 140 and second left plate portion 152 of left plate 150 are restricted in movement toward the outer sides of storage battery unit 1 by second front plate portions 123 and 124. Since second right plate portion 142 and second left plate portion 152 are respectively concealed by second front plate portions 123 and 124, it is possible to conceal fastening components with second front plate portions 123 and 124 when second right plate portion 142 and second left plate portion 152 are fixed using the fastening components.

Storage battery unit 1 according to the present embodiment includes battery module 30 and unit circuit 20. Battery module 30 includes cells 420 and module circuit 500. Electric power lines 531 and 532, and communication lines 534 and 535 are connected to module circuit 500. Electric power lines 531 and 532 input and output electric power to and from cells 420. Communication lines 534 and 535 input and output the information about cells 420. Unit circuit 20 is connected to module circuit 500 by electric power lines 254, 255, and 257, and communication lines 256 and 258. Unit circuit 20 is connected to the external electric power conversion device 2. A first direction in which battery module 30 and unit circuit 20 are arranged is a vertical direction. The pair of lateral surfaces facing each other, among a plurality of lateral surfaces excluding a top surface and a bottom surface of storage battery unit 1 when disposed, are a first surface and a second surface. Module circuit 500 includes first terminal 521. First terminal 521 is connected to one end of each of electric power lines 254, 255, and 257 and one end of each of communication lines 256 and 258, and is disposed at one of the first surface and the second surface (right side surface). Unit circuit 20 includes second terminal 221. Second terminal 221 is connected to electric power conversion device 2, and is disposed at the other of the first surface and the second surface (left side surface).

With this, first terminal 521 of battery module 30 is disposed at the positive end of the X-axis, which is on a side opposite to second terminal 221, even when second terminal 221 of storage battery unit 1 is connected to the external electric power conversion device 2. Accordingly, an operator can easily work on first terminal 521 when performing maintenance work on battery module 30, e.g. adjustment and exchanging work.

External electric power lines 251 and 252, and external communication line 253 for connecting storage battery unit 1 to the external electric power conversion device 2 are generally disposed at the wall of a building. Accordingly, storage battery unit 1 is disposed with second terminal 221 of storage battery unit 1 facing the wall when storage battery unit 1 is connected to external electric power lines 251 and 252, and external communication line 253. Accordingly, it is difficult for storage battery unit 1 to be moved away from the wall. Since first terminal 521 of battery module 30 is subject to being worked on, e.g. maintenance work, it is important that first terminal 521 can easily be worked on.

In storage battery unit 1 according to the present embodiment, first terminal 521 of battery module 30 is disposed on a side opposite to second terminal 221 of storage battery unit 1. In other words, first terminal 521 is disposed on a side opposite to the wall in a state in which storage battery unit 1 is connected to external electric power lines 251 and 252, and external communication line 253. Accordingly, the operator can easily work on first terminal 521 that is connected to battery module 30 of storage battery unit 1.

In storage battery unit 1 according to the present embodiment, unit circuit 20 further includes third terminal 231. Third terminal 231 is connected to the other end of electric power line 254 and the other end of communication line 256, and is disposed at one of the first surface and the second surface (right side surface).

With this, third terminal 231 is disposed on the same side as first terminal 521 of battery module 30. Accordingly, it is possible to shorten electric power lines 254, 255, and 257, and communication lines 256 and 258 that are connected to unit circuit 20 and battery module 30 as much as possible.

In storage battery unit 1 according to the present embodiment, first terminal 521 includes electric power line terminal 522 and communication line terminal 523. Electric power line terminal 522 is connected to the one end of each of electric power lines 254, 255, and 257. Communication line terminal 523 is connected to the one end of each of communication lines 256 and 258. Third terminal 231 includes electric power line terminal 232 and communication line terminal 233. Electric power line terminal 232 is connected to the other end of electric power line 254. Communication line terminal 233 is connected to the other end of communication line 256. When storage battery unit 1 is disposed assuming that the first direction is the vertical direction, electric power line terminal 522 is disposed at one side of communication line terminal 523 in the horizontal direction (positive end of the Y-axis). Electric power line terminal 232 is disposed at one side communication line terminal 233 in the horizontal direction (positive end of the Y-axis).

Accordingly, it is possible to connect electric power lines 254, 255, and 257, and communication lines 256 and 258 to module circuit 500 and unit circuit 20 without electric power lines 254, 255, and 257, and communication lines 256 and 258 intersecting. As such, it is possible to reduce noise contamination from electric power lines 254, 255, and 257 with respect to communication lines 256 and 258.

In storage battery unit 1 according to the present embodiment, electric power line terminal 522 and communication line terminal 523 are aligned in the horizontal direction (Y-axis). Electric power line terminal 232 and communication line terminal 233 are aligned in the horizontal direction (Y-axis). Electric power line terminal 522 and electric power line terminal 232 are aligned in the vertical direction (Z-axis). Communication line terminal 523 and communication line terminal 233 are aligned in the vertical direction (Z-axis).

With this, electric power lines 254, 255, and 257, and communication lines 256 and 258 are disposed substantially parallel. Accordingly, it is possible to shorten electric power lines 254, 255, and 257, and communication lines 256 and 258 as much as possible.

In storage battery unit 1 according to the present embodiment, a surface different from the first surface (right side surface) and the second surface (left side surface) among the plurality of lateral surfaces is a third surface (rear surface). Second terminal 221 is disposed on unit circuit 20 in an orientation in which second terminal 221 is connected, via the third surface (rear surface), to external electric power lines 251 and 252 that are connected between second terminal 221 and electric power conversion device 2. Electric power line terminal 232 is disposed at a side opposite (front surface) to the third surface (rear surface) sandwiching communication line terminal 233.

With this, second terminal 221 is disposed on unit circuit 20 in an orientation in which second terminal 221 is connected, via the rear side, to external electric power lines 251 and 252 that are connected between second terminal 221 and electric power conversion device 2. Accordingly, when electric power lines 254, 255, and 257, and communication lines 256 and 258 are connected at the left side of storage battery unit 1, it is necessary to bend each wire inside unit circuit 20 at an angle of 90°. At this point, it is possible to make a radius of curvature of the electric power lines inside unit circuit 20 running toward second terminal 221 larger than a radius of curvature of the communication lines inside unit circuit 20 running toward second terminal 221 since electric power line terminal 232 is disposed more toward the front side than communication line terminal 233 is. It is possible to dispose the electric power lines and the communication lines in unit circuit 20 in a state in which a stress on the electric power lines is reduced since a diameter of each electric power line is generally larger than a diameter of each communication line.

3. Variation

In storage battery unit 1 according to the above embodiment, lateral plates 120 to 150 may have a configuration in which they are locked by restrictors in the bottom portion of support rack 170 that restrict the movement of the bottom portions of lateral plates 120 to 150 downward and toward the outer sides of support rack 170. With this, the top portions of lateral plates 120 to 150 are fixed to support rack 170 with fastening components in a state in which the bottom portions of lateral plates 120 to 150 are restricted in movement downward and toward the outer sides of support rack 170 by the restrictors. Accordingly, it is possible to fix lateral plates 120 to 150 to support rack 170 by simply fixing the top portions of lateral plates 120 to 150 with the fastening components. As such, the operator can detach lateral plates 120 to 150 from support rack 170 by only removing the fastening components coupled to the top portions of lateral plates 120 to 150.

In storage battery unit 1 according to the above embodiment, rear plate 130 may include fixing components similar to front plate 120.

A storage battery unit according to one or more aspects of the present invention has been described above based on the embodiment, but the present invention is not limited thereto. Forms obtained by various combinations of the components in the different embodiments that can be conceived by a person skilled in the art which are within the scope of the essence of the present invention are also included in the scope of the one or more aspects of the present invention.

REFERENCE MARKS IN THE DRAWINGS

1 Storage battery unit
2 Electric power conversion device
10 Casing
20 Unit circuit
30 Battery module
110 Top plate
111 First top plate portion
113 Fastening component
120 Front plate
121 First front plate portion
122 Fixing component
122a Through-hole
123, 124 Second front plate portion
125 Third front plate portion
130 Rear plate
132 Second rear plate portion
140 Right plate
141 First right plate portion
142 Second right plate portion
143 third right plate portion
150 Left plate
151 First left plate portion
152 Second left plate portion
153 Third left plate portion
160 Bottom plate
170 Support rack
254, 255, 257 Electric power line
256, 258, 534, 535 Communication line
420 Cell
500 Module circuit
531 Positive electrode electric power line
532 Negative electrode electric power line

The invention claimed is:

1. A storage battery unit, comprising:
a battery module that includes a plurality of cells, and a module circuit connected to (i) an electric power line for inputting and outputting electric power to and from the plurality of cells and (ii) a communication line for inputting and outputting information about the plurality of cells;
a unit circuit that is connected to (i) the module circuit by the electric power line and the communication line, and (ii) an electric power conversion device disposed externally; and
a casing that accommodates the battery module and the unit circuit, wherein:
the casing includes a plurality of tabular components,
the plurality of tabular components include at least a top plate disposed on a top surface of the storage battery unit, a bottom plate disposed on a bottom surface, and at least one lateral plate disposed on a lateral surface excluding the top surface and the bottom surface of the storage battery unit,
the top plate includes a first top plate portion that substantially covers an entirety of the top surface,
the at least one lateral plate includes a first lateral plate portion that substantially covers an entirety of the lateral surface, and a fixing component that is tabular and integrated into the first lateral plate portion, and
the fixing component is disposed along the first top plate portion; and wherein the casing further includes a support rack that supports the battery module and the unit circuit, and the first top plate portion and the fixing component each include a through-hole, and are fixed to each other by a fastening component being screwed into the support rack in a state in which the fastening component passes through the through-hole of the first top plate portion and the through-hole of the fixing component.

2. The storage battery unit according to claim 1, wherein a front plate disposed on a front surface of the storage battery unit, among the at least one lateral plate, includes the fixing component.

3. The storage battery unit according to claim 2, wherein the top plate further includes a second top plate portion along the at least one lateral plate, and
the at least one lateral plate further includes a second lateral plate portion disposed more inwardly than the second top plate portion.

4. The storage battery unit according to claim 3, wherein the front plate disposed on the front surface of the storage battery unit, among the at least one lateral plate, includes a first front plate portion that substantially covers an entirety of the front surface as the first lateral plate surface, and a second front plate portion along a left side surface and a right side surface of the storage battery unit,
a left plate disposed on the left side surface, among the at least one lateral plate, includes a first left plate portion that substantially covers an entirety of the left side surface as the first lateral plate portion, and a second left plate portion that is disposed more inwardly than the second front plate portion of the front plate, and
a right plate disposed on the right side surface, among the at least one lateral plate, includes a first right plate portion that substantially covers an entirety of the right side surface as the first lateral plate portion, and a second right plate portion that is disposed more inwardly than the second front plate portion of the front plate.

* * * * *